(12) United States Patent
Kell et al.

(10) Patent No.: US 8,559,614 B2
(45) Date of Patent: *Oct. 15, 2013

(54) SYSTEMS AND METHODS OF PROVIDING MULTI-HOMED TANDEM ACCESS

(75) Inventors: Scott D. Kell, Chicago, IL (US); James E. Brewer, Chicago, IL (US); Anthony J. Hiller, Chicago, IL (US)

(73) Assignee: Peerless Network, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/598,710

(22) Filed: Aug. 30, 2012

(65) Prior Publication Data

US 2012/0320907 A1    Dec. 20, 2012

Related U.S. Application Data

(63) Continuation of application No. 12/469,511, filed on May 20, 2009, now Pat. No. 8,275,112.

(60) Provisional application No. 61/054,713, filed on May 20, 2008.

(51) Int. Cl.
*H04M 7/00* (2006.01)
*H04L 12/66* (2006.01)

(52) U.S. Cl.
USPC .. 379/224; 370/352; 379/220.01; 379/221.13

(58) Field of Classification Search
USPC ............... 370/352; 379/219, 220.01, 221.13, 379/221.14, 224
See application file for complete search history.

(56) References Cited

U.S. PATENT DOCUMENTS

| | | | |
|---|---|---|---|
| 4,442,321 A | 4/1984 | Stehman |
| 4,476,347 A | 10/1984 | Hagen et al. |
| 5,404,350 A | 4/1995 | DeVito et al. |
| 5,509,059 A | 4/1996 | Crevits |
| 5,566,236 A | 10/1996 | MeLampy et al. |
| 5,610,977 A | 3/1997 | Williams et al. |
| 5,661,792 A | 8/1997 | Akinpelu et al. |
| 5,764,745 A | 6/1998 | Chan et al. |
| 5,844,981 A | 12/1998 | Pitchford et al. |
| 5,930,348 A | 7/1999 | Regnier et al. |
| 5,940,492 A | 8/1999 | Galloway et al. |
| 5,953,403 A | 9/1999 | Lefort et al. |
| 6,014,378 A | 1/2000 | Christie et al. |
| 6,047,055 A | 4/2000 | Carkner et al. |
| 6,137,869 A | 10/2000 | Voit et al. |
| 6,282,574 B1 | 8/2001 | Voit |
| 6,292,481 B1 | 9/2001 | Voit et al. |

(Continued)

*Primary Examiner* — Harry Hong
(74) *Attorney, Agent, or Firm* — Marshall, Gerstein & Borun LLP; Randall G. Rueth (57) ABSTRACT

Systems and methods for providing multi-homed tandem access in a communication system are disclosed. The disclosure may include a private packet network backbone exchange (PPNBE) in connection with a set of access tandems and with a call destination such as an end-user or a communications service. A set of LRNs may be homed across the set of access tandems, with each of the set of LRNs mapped to one or more TNs corresponding to the call destination. An originating party may use any of the TNs to reach the call destination. A plurality of originating calls each including one of the TNs may be received at the PPNBE from any of the access tandems and routed to the call destination. Thus, the present disclosure provides greater call capacity than available access tandem architectures as well as optimizes a maximum number of call paths to a particular call destination.

23 Claims, 5 Drawing Sheets

(56) References Cited

U.S. PATENT DOCUMENTS

| | | |
|---|---|---|
| 6,393,115 B1 | 5/2002 | Krauss et al. |
| 6,405,028 B1 | 6/2002 | DePaola et al. |
| 6,415,151 B1 | 7/2002 | Kreppel |
| 6,430,275 B1 | 8/2002 | Voit et al. |
| 6,480,898 B1 | 11/2002 | Scott et al. |
| 6,529,596 B1 | 3/2003 | Asprey et al. |
| 6,532,288 B1 | 3/2003 | Wood et al. |
| 6,574,201 B1 | 6/2003 | Kreppel |
| 6,574,326 B1 | 6/2003 | Wong et al. |
| 6,574,328 B1 | 6/2003 | Wood et al. |
| 6,636,528 B1 | 10/2003 | Korpi et al. |
| 6,865,266 B1 | 3/2005 | Pershan |
| 6,870,857 B1 | 3/2005 | Clevenger |
| 6,944,150 B1 | 9/2005 | McConnell et al. |
| 6,985,446 B1 | 1/2006 | Hurtta et al. |
| 6,999,463 B2 | 2/2006 | Christie et al. |
| 7,038,574 B1 | 5/2006 | Schlesener et al. |
| 7,069,301 B2 | 6/2006 | Jerbi et al. |
| 7,096,023 B1 | 8/2006 | Eikkula |
| 7,123,708 B1 | 10/2006 | Gavillet |
| 7,248,576 B2 | 7/2007 | Hoffmann |
| 7,333,441 B2 | 2/2008 | Balletti et al. |
| 7,336,649 B1 | 2/2008 | Huang |
| 7,340,436 B1 | 3/2008 | Lilge |
| 7,372,869 B2 | 5/2008 | Lobig |
| 7,617,287 B2 | 11/2009 | Vella et al. |
| 7,751,549 B1 | 7/2010 | Dianda |
| 7,889,722 B2 | 2/2011 | Thompson |
| 8,275,112 B1 * | 9/2012 | Kell et al. ............. 379/224 |
| 2003/0131132 A1 | 7/2003 | Cheng et al. |
| 2005/0281399 A1 | 12/2005 | Moisey et al. |
| 2010/0042696 A1 | 2/2010 | Vella et al. |

* cited by examiner

SYSTEMS AND METHODS OF PROVIDING MULTI-HOMED TANDEM ACCESS

CROSS-REFERENCE TO RELATED APPLICATIONS

This application is a continuation of U.S. patent application Ser. No. 12/469,511, filed May 20, 2009, which claims priority to U.S. Patent Provisional Application Ser. No. 61/054,713, filed May 20, 2008, the disclosures of which are hereby expressly incorporated herein by reference.

TECHNICAL FIELD

The following disclosure relates to systems and methods for providing a multi-homed tandem access in a communication system. The systems and methods may use a private network backbone exchange.

BACKGROUND

In today's telephony and communication networks, an access tandem may provide connections between inter-exchange or long distance exchanges (IXCs) and end-office exchanges. An access tandem is typically engineered to provide trunking and other resources to handle expected call traffic loads.

Bottlenecks may arise when a sudden surge of originations occur, where each of the originations indicates a same or common desired destination accessible via a particular access tandem. All originations indicating the same or common destination must traverse the particular access tandem more or less simultaneously, or at least within a short time interval, in order to reach the common desired destination. The sudden surge may increase call traffic loads to a greater capacity than a capacity for which the particular access tandem was engineered to handle.

These scenarios may occur when the desired destination corresponds to a communications service. For example, such a scenario may occur when a television program advertises a call-in vote. Viewers may originate a large volume of calls over a short duration of time destined for the same voting communications service. Another example may be when a corporate, university, conference or trade-show hosts a conference call. Here, a plethora of attendees may call in to a conference call bridge more or less simultaneously. Yet another example of a sudden surge of originations for a common destination may occur when tickets for a popular concert go on sale.

In these and other examples, support to handle the sudden surge of originations may be limited by the available resources of the access tandem. A bottleneck may occur on an originating side of the access tandem, for instance, over the trunking resources from an originating local exchange or IXC to the access tandem. Other bottlenecks may occur on the terminating side of the access tandem, for instance, over the trunking resources from the access tandem to a local exchange where the desired destination or communication service may be accessed. Logical resources internal to the access tandem may also be limited. Trunking and other call resources may be expensive to engineer, implement and maintain, so typically, the resources are not engineered for a maximum surge scenario. Accordingly, the amount of available resources at the access tandem may be insufficient to support sudden, large load surges. Many of the calls may be blocked, resulting in inconvenience and frustration for the callers, not to mention incompletion of the desired communications service and a potential loss of revenue.

SUMMARY OF THE DISCLOSURE

Embodiments of a system for providing multi-homed tandem access are disclosed. The system may include a private packet network backbone exchange, a plurality of access tandem exchanges, and a destination or endpoint. The destination or endpoint may be indicated by any Terminal or Telephone Number (TN) in a set of TNs corresponding to the destination or endpoint. An originating party may dial any TN from the set of TNs in an attempt to reach the endpoint. Each TN in the set may correspond to a particular LRN (Local Routing Number), and the particular LRN may be homed to a particular access tandem exchange in the plurality of access tandem exchanges. Each of the plurality of access tandem exchanges may be in connection with a private packet network backbone exchange (PPNBE), and the PPNBE may be in connection with the endpoint. The system may provide numerous alternatives for call completion, and may optimize a maximum number of call paths to the same destination endpoint. The same destination endpoint may support a communications service.

Embodiments of a method of accessing a communications service using multi-homed tandem access are disclosed. The method may include receiving a plurality of calls from at least one of a set of access tandems and routing the plurality of calls via a private packet network backbone exchange (PPNBE) to a common endpoint. Each of the plurality of calls may include a TN from a set of TNs corresponding to the endpoint, and each TN in the set of TNs may correspond to a LRN homed to one of the set of access tandems.

Embodiments of a method of delivering an increased volume of simultaneous calls to an endpoint are disclosed. The method may include communicating a homing arrangement, e.g., a mapping of each of a plurality of LRNs to a different access tandem in a set of access tandems. The method may include communicating an assignment arrangement, e.g., a mapping of each TN from a set of TNs corresponding to the endpoint to various LRNs in the plurality of LRNs, so that the set of TNs are distributed, for routing purposes, across the set of access tandems. The method may include receiving a plurality of calls from at least one access tandem and routing the plurality of calls, via a PPNBE, to the endpoint.

Embodiments of another method of delivering an increased volume of simultaneous calls to an endpoint are disclosed. The method may include coupling an end-office exchange to each of a plurality of access tandems, providing a list of TNs corresponding to the endpoint wherein members of the list of TNs are distributed, for routing purposes, across the plurality of access tandems. The method may include receiving an originating call including a selected TN from the list of TNs, and routing the originating call to the corresponding access tandem.

DETAILED DESCRIPTION

The present disclosure hereby incorporates by reference, in its entirety, co-pending U.S. patent application filed May 20, 2009 and entitled "System and Method of Providing Communication Service Using a Private Packet Network Backbone Exchange."

Figure 1:
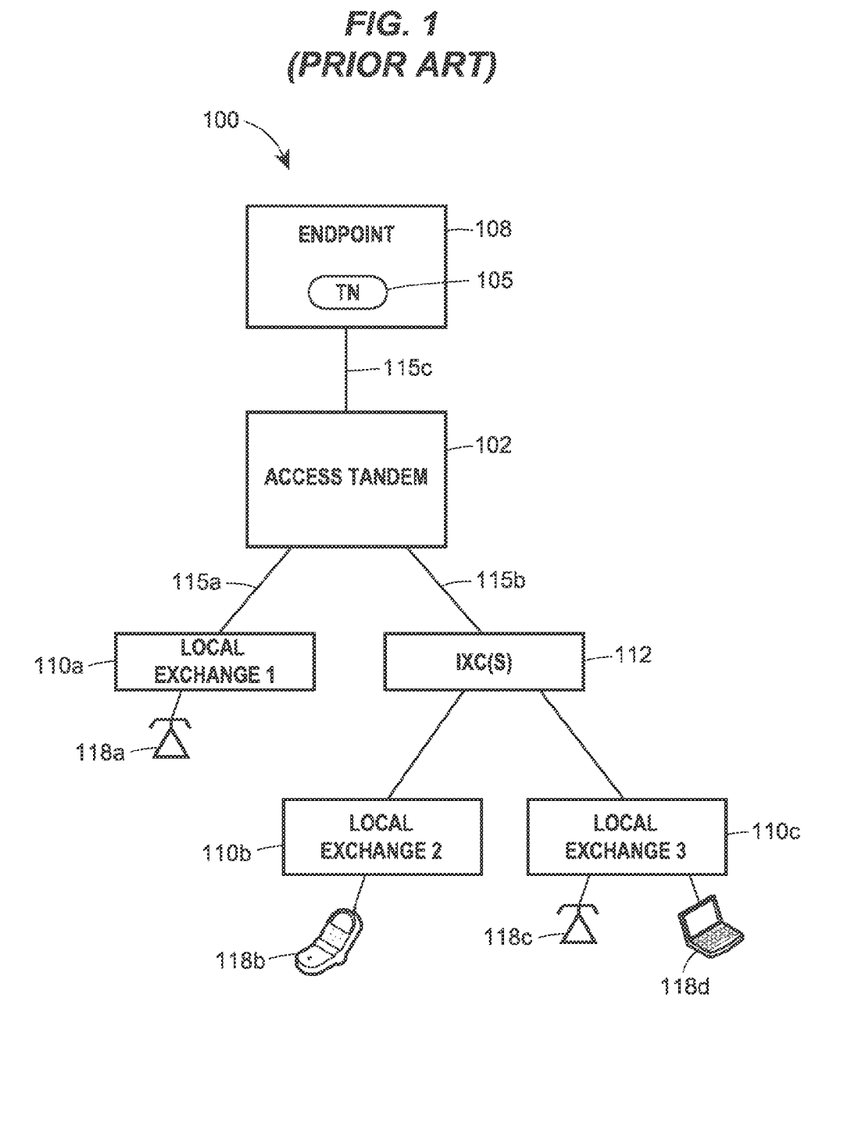
FIG. 1 depicts an embodiment of a current communication system using single-homed tandem access.

FIG. 1 depicts an embodiment of a current communication system 100 with single-homed tandem access. The system 100 may include an access tandem exchange 102. Calls destined for an endpoint 108 may originate at one or more local exchanges 110a-110c and may indicate a TN (Telephone or Terminating Number) 105 corresponding to the endpoint 108. Based on the TN 105, originating calls may be routed to the access tandem 102 to reach the desired destination 108.

The access tandem 102 may be any type of access tandem known in the art. The access tandem 102 may provide interconnections between end-office switches or their equivalents 110a-110c, Inter Exchange Carriers (IXCs) or other long-distance exchanges 112, and/or other access tandems (not shown). The access tandem 102 may be owned and/or operated by an ILEC (Regional Bell Operating Carrier), LEC (Local Exchange Carrier), CLEC (Competitive Local Exchange Carrier) or other entity.

The endpoint 108 corresponding to the TN 105 may be a CPE (Customer Premises Equipment), end-user or communications service supported by another local exchange other than originating local exchanges 110a-110c. Examples of communications services may include a conference call service, a voting or preference-indicating service, a help-line, an electronic fax service or a ticket sales service, to name a few.

The local exchanges 110a-110c may each be any type of local exchange known in the art that may connect to the access tandem 102 and may be able to support end-user originations of voice, data or combination of voice and data calls. For example, a local exchange 110a-110c may be a Class 5 switch or LEC (Local Exchange Carrier) exchange, a CLEC (Competitive Local Exchange Carrier) exchange, or an exchange provided by a communications service provider such as a wireless service provider, a VoIP service provider, a cable telephony service provider, and the like. A local exchange 110a-110c may be a private exchange, such as a PBX (Private Branch Exchange) or other essentially private switch or exchange that services an organization such as a corporation, university, or other entity.

Of course, the number and types of local exchanges 110a-110c shown in FIG. 1 are exemplary. Any number of local exchanges 110a-110c of any known type may be present in the system 100. Note that in some cases, a local exchange 110a may route a call directly over one or more trunk groups (represented by reference 115a) to reach the access tandem 102. In some other cases, a local exchange 110b or 110c may route a call to the access tandem 102 through a portion of the PSTN (Public Switched Telephone Network). In the illustration of FIG. 1, local exchanges 110b and 110c are depicted as routing call through a network of one or more IXCs (Inter Exchange Carriers) 112 and over one or more trunk groups 115b to reach the access tandem 102. In other embodiments, calls may be routed through a network of one or more tandem switches, or even through some combination of IXCs and tandem switches in order to reach the access tandem 102.

Each local exchange 110a-110c may service any number of end-customer or users, represented by references 118a-118d in FIG. 1. End-customers may originate and terminate calls via a CPE 118a-118d corresponding to a communications access technology supported by their respective corresponding local exchange. A CPE may be, for example, a landline phone, a computer, a wireless device, or other device used by an originating calling party. Calls originating from end-customer CPEs 118a-118d may be routed through their respective local exchange 110a-110c and to the access tandem 102 for delivery to the endpoint destination 108. For example, a call originated by the CPE 118b may be routed through the local exchange 110b, through the network of IXCs 112, over the trunk group 115b and to the access tandem 102 for delivery over a trunk group 115c to the endpoint 108.

Consider a scenario where a sudden surge of originations destined for the endpoint 108 are generated by a plurality of CPEs 118a-118d at one or more of the local exchanges 110a-110c. Each of the originations may indicate the TN 105, and thus each origination may routed towards the access tandem 102 via which the TN 105 corresponding to the endpoint 108 may be accessed. The surge of originations must traverse the trunk groups 115a and/or 115b in order to reach the access tandem 102. However, due to cost and other considerations, the trunk groups 115a and 115b may not be engineered to handle a "worst-case scenario" volume of call traffic that may occur relatively infrequently. Likewise, the terminating trunk group(s) 115c between the access tandem 102 and the destination endpoint 108 may also be engineered for a smaller than "worst-case-scenario" load. Moreover, an overall logical call capacity of the access tandem 102 itself may also limit the maximum traffic load. If and when any of these resources are insufficient, calls may be dropped or blocked. Dropped or blocked calls may result in the end-users 118a-118d repeatedly re-dialing the same number in an attempt to connect to the endpoint 108, thus causing even more call traffic and exacerbating the congestion.

Figure 2:
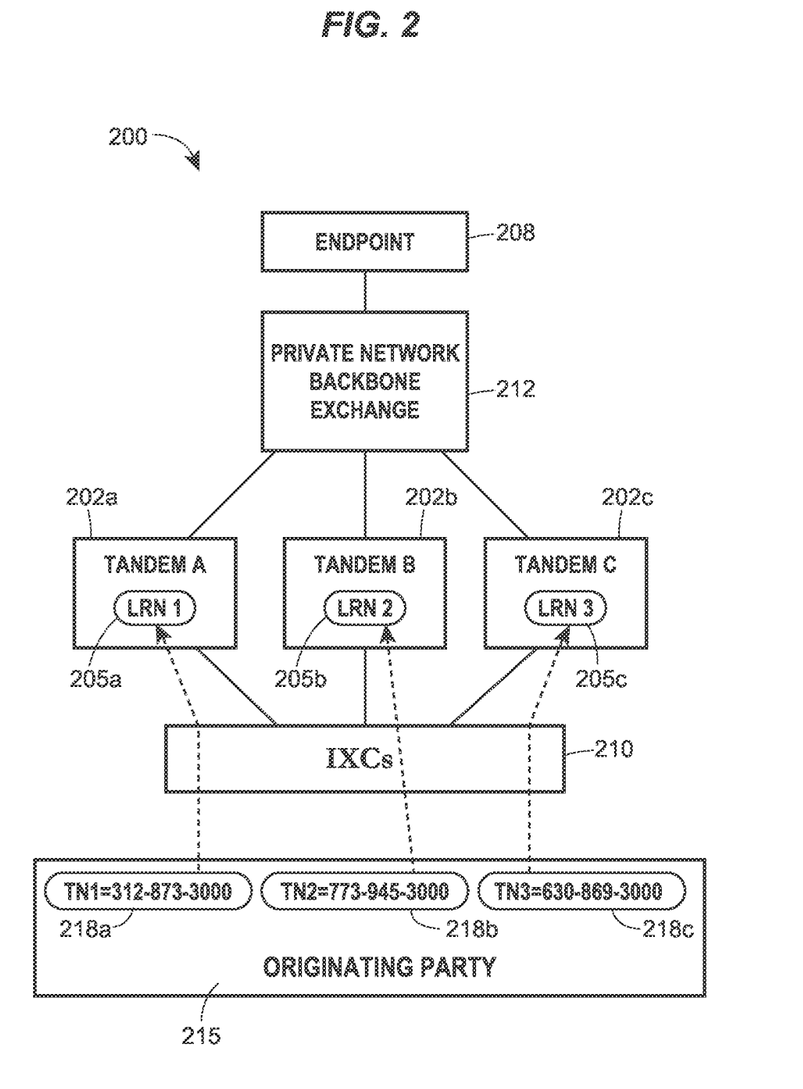
FIG. 2 illustrates an embodiment of a system for providing multi-homed tandem access.

FIG. 2 illustrates an embodiment of a system 200 for providing multi-homed tandem access. The system 200 may include multiple tandem access exchanges 202a-202c. A respective local routing number 205a-205c may be homed to each access tandem 202a-202c.

Similar to FIG. 1, the endpoint 208 may support a communications service at a local exchange, a CPE or an end-user. Examples of communications services may include a conference call service, a voting or preference-indicating service, a help-line, an electronic fax service or a ticket sales service, to name a few.

Each of the access tandems 202a-202c may be any type of access tandem known in the art. The access tandems 202a-202c may provide interconnections between end-office switches, exchanges or their equivalents (not shown), Inter Exchange Carriers (IXCs) or other long-distance exchanges 210, each other 202a-202c, and/or other access tandems (not shown). The access tandems 202a-202c may each be owned and/or operated by a same or different ILEC or other entity. In FIG. 2, the access tandems 202a-202c are shown as being accessible to an originating party 215 via a network of one or more IXCs or long-distance switches 210. In other embodiments, some or all of the access tandems 202a-202c may be directly interconnected, may be accessible directly from a local exchange, or may be accessible via a different network of one or more tandem exchanges.

The tandem exchanges 202a-202c may each be in connection with a private packet network backbone exchange (PPNBE) 212. The PPNBE 212 may also be in connection with the desired destination endpoint 208. Details of the PPNBE 212 will be discussed in a separate figure, but generally, the PPNBE 212 may be an exchange using a private packet network backbone. Available trunking resources to and from the PPNBE may be much greater than available trunking resources of an access tandem, and thus the PPNBE 212 may support much greater traffic loads than a conventional access tandem, such as access tandem 102 of FIG. 1.

The multi-homed tandem access system 200 may overcome trunking and other resource constraints of the single-homed tandem access system 100 to provide access to the endpoint 208. In fact, with the multi-homed tandem access system 200, a call originating from a CPE 215 may have a higher probability of being completed to the endpoint 208, even during a sudden surge of call traffic. To illustrate, consider an originating party 215 attempting to call the endpoint 208. The originating party 215 may originate a call using a CPE corresponding to a technology supported by a respective corresponding local exchange. A CPE may originate the call using at least one of a wired access technology, a wireless access technology, a broadband access technology such as VoIP, a cable telephony access technology, or, indeed, any other communications access technology. In some embodiments, for VoIP access technologies, the CPE may use a dedicated IP connection, the Internet or some combination of the two, for example, for load-balancing, overflow, redundancy or fail-over purposes. The CPE may be, for example, a landline phone, a computer, a wireless device, or any other communications device. In fact, the multi-homed access system 200 may support the routing of originating calls of any known communications access technology to the endpoint 208.

The CPE may gain communication access via a corresponding local exchange (not shown), such as one of the local exchanges 110a-110c described in FIG. 1. The corresponding local exchange may each be any type of local exchange known in the art that may connect to the access tandems 202a-202c and/or to one or more IXCs 210, and that may be able to support end-user originations of voice, data or combination of voice and data calls. For example, the corresponding local exchange may be a Class 5 switch or LEC exchange, a CLEC exchange, or an exchange provided by a communications service provider such as a wireless service provider, a VoIP service provider, a cable telephony service provider, and the like. The corresponding local exchange may be a private exchange, such as a PBX (Private Branch Exchange) or other essentially private switch or exchange that services an organization such as a corporation, university, or other entity. The multi-homed access system 200 may support the routing of originating calls from any type of local exchange to the endpoint 208.

The originating party may be provided with a set of Terminating or Telephone Numbers (TNs) 218a-218c, each of which may correspond to the endpoint 208. Each TN 218a-218c may correspond or be mapped to a respective LRN 205a-205c. In the example of FIG. 2, a one-to-one TN to LRN relationship is illustrated, however, in some embodiments, a many-to-one correspondence between multiple TNs and a given LRN may be additionally or alternatively possible.

The set of LRNs 205a-205c may be homed across the set of access tandems 205a-205c. In a preferred embodiment, relationships of the set of TNs 218a-218c to LRNs 205a-205c and the set of LRNs 205a-205c to access tandems 202a-202c may be configured so that the set of TNs 218a-218c may be effectively distributed, for routing purposes, across all access tandems 202a-202c in connection with the PPNBE 212. Thus, the originating party 215 may dial any TN in the set of TNs 218a-218c in an attempt to reach the call destination 208. If a given TN (and associated LRN and tandem) is busy or otherwise unavailable, the originating party 215 may not be automatically blocked from completing his or her desired call, as illustrated in FIG. 1. Instead, the originating party 215 simply may try a different TN from the set 218a-218c to attempt to reach the endpoint 208.

For example, in the scenario depicted by FIG. 2, the originating party 215 may try a first TN 218a corresponding to the endpoint 208 by dialing the corresponding digits "312-878-3000." The first TN 218a may correspond to "LRN 1" 205a homed to the access tandem 202a. In this scenario, the first attempt may be blocked at the access tandem 202a, for instance, due to resource availability. The originating party 215 may then try a second TN 218b and may dial its corresponding digits "773-945-3000." The second TN 218b may correspond to "LRN 2" 205b homed to the access tandem 202b. If the second attempt is blocked, the originating party 215 may then try a third TN 218c and may dial its corresponding digits "630-869-3000." The third TN 218c may correspond to "LRN 3" 205c homed to the access tandem 202c. At the tandem 202c, sufficient resources may be available and the call may be free to connect via the tandem 202c and the PPNBE 212 to the desired endpoint 208. Thus, with the system 200, when resources are at a premium, the originating party 215 may not be automatically blocked from completing a call to the desired destination 208, but instead may be provided with multiple alternatives for call completion. In this manner, the system 200 for providing multi-homed tandem access may enable an optimization of a maximum number of call paths to a given end user or destination 208.

In some embodiments, a local exchange (not shown) via which the originating party 215 may gain communications access may be directly connected to a corresponding tandem exchange 202a-202c without traversing through any IXC 210. For these embodiments, an originating call from the originating party 215 may still be routed directly from the local exchange to the corresponding tandem exchange 202a-202c and the PPNBE 212, and to the endpoint 208.

In some embodiments, the communications service supported by the endpoint 208 and/or the endpoint 208 itself may be a customer of a service provider that owns and/or operates the PPNBE 212.

Figure 3:
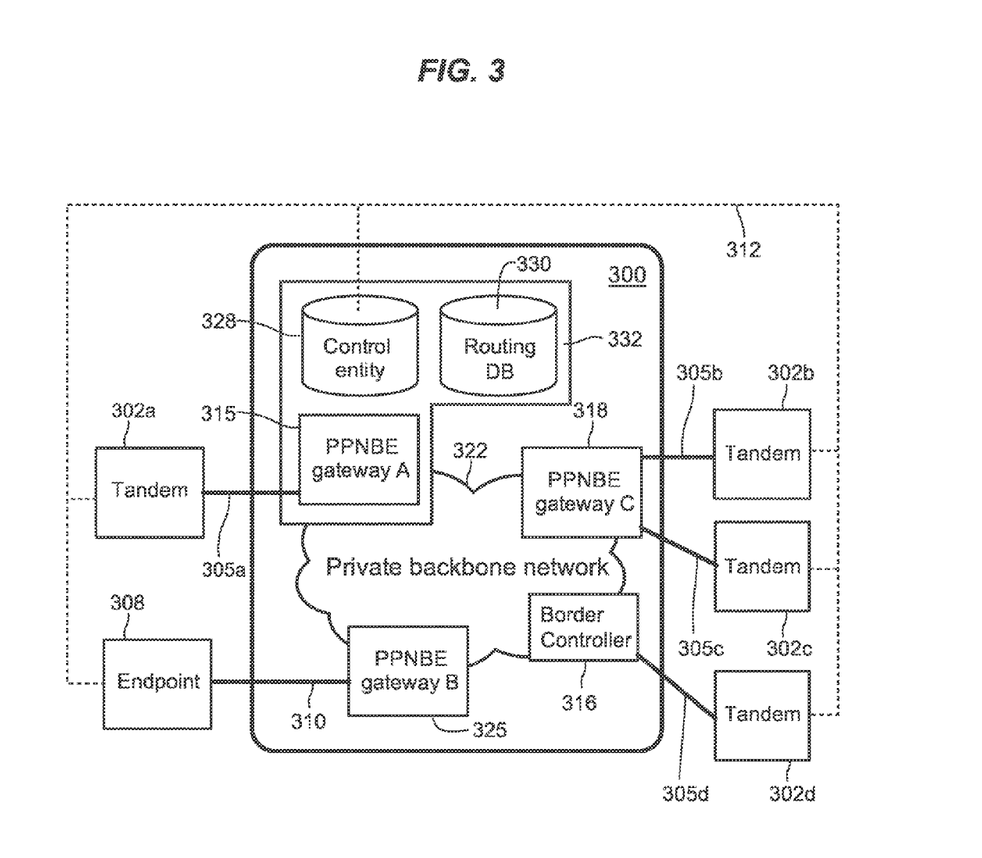
FIG. 3 illustrates an example of a private packet network backbone exchange used for multi-homed tandem access.

FIG. 3 illustrates an example of a private packet network backbone exchange (PPNBE) 300 used for multi-homed tandem access. FIG. 3 illustrates possible details of the PPNBE 212 of FIG. 2. In fact, embodiments of the PPNBE 300 may be used in conjunction with embodiments of the system 200 of FIG. 2.

In FIG. 3, the PPNBE 300 may be connected to one or more access tandem exchanges 302a, 302b, 302c, 302d. One or more respective originating trunk groups 305a-305d may respectively connect each access tandem 302a-302d to the PPNBE 300. The PPNBE 300 may also be in connection with an endpoint 308 via one or more terminating trunk groups 310. In a preferred embodiment, the terminating trunk group 310 may be the only terminating trunk group between the PPNBE 200 and the endpoint 308. Having only a single terminating trunk group 310 optimizes configuration and administrative costs, and is easily supported by the easily configurable PPNBE 300 architecture.

The endpoint exchange 308, the PPNBE 300, and each of the access tandems 302a-302c may be in signaling communication with a signaling network 312, depicted in FIG. 3 by the dashed lines. The signaling network 312 may be an out-of band network, an in-band network, or some combination of the two. In some embodiments, the signaling network 312 may be an SS7 (Signaling System No. 7) network. In some embodiments, different types of signaling may be used for different access tandems 302a-302d and for the endpoint 308. Calls may be established between the access tandems 302a-

302d, the PPNBE 300 and/or the endpoint exchange 308 using the signaling network 312, out-of-band technologies, and/or in-band signaling technologies 305a-305d known in the art, such as SS7, TDM (Time Division Multiplex), SIP (Session Initiation Protocol), or VoIP technologies.

Call traffic may enter the private packet network backbone exchange 300 from an access tandem 302a-302d via an originating PPNBE gateway (315, 316, 318). As used herein, the term "PPNBE gateway" is not limited to mean a gateway of any particular technology, but may include gateways 315, 316, 318 that may support any type of communication technology, for example, a TDM-supporting gateway 315, a VoIP-supporting gateway 316 such as a session border controller, or some other technology-supporting gateway 318. Call traffic may then traverse a private network backbone 322 to a terminating PPNBE gateway 325 in communication with the endpoint 308, and be routed from the terminating PPNBE gateway 325 over the terminating trunk group 310 to the endpoint 308. Likewise, the terminating PPNBE gateway 325 may also support any type of communication technology such as TDM, VoIP, SIP, etc. For some calls, the originating gateway 315, 316, 318 and the terminating gateway 325 may be the same entity.

In some embodiments, the private network backbone 322 may include a set of privately managed nodes (not shown) to route packet call traffic. Each PPNBE gateway (315, 316, 318) may convert incoming call traffic from the protocol or format used by the access tandem 302a-302d into a packet format used by the set of privately managed nodes in the private network backbone 322. In some embodiments, the set of privately managed nodes may communicate using a packet format corresponding to an Internet Protocol format (IP). In some embodiments, the private network backbone 322 may use other types of technologies other than IP to deliver call traffic within the private network backbone 322, such as ATM or other packet/cell switching technologies.

Packets or cells may be routed across the privately managed nodes in the private network backbone 322 to the terminating PPNBE gateway 325, where the packets or cells may be converted into a format understood by the endpoint 308. As the private network backbone 322 is not the public Internet and is privately managed, the number of nodes and routing of packets within the network 322 may be engineered and controlled to maximize call quality and minimize delay.

In the private packet network backbone exchange 300, call control may be performed by a logical call control entity 328. The control entity 328 may include one or more servers or cloud computing devices, or other computing devices having a memory and having the ability to interface with the signaling network 312. Control entity 328 may provide call control as well as feature, service and other types of control needed for communication service. Control entity 328 may be represented to the PSTN and other networks as a single logical point code or may be identified via information in a single logical routing database 330. Control entity 328 may or may not be physically co-located with the logical routing database 330, but information in the logical routing database 330 may be accessible for use by the control entity 328 in establishing calls.

In the embodiment of the configuration illustrated in FIG. 3, the call control entity 320, the routing database 330 and PPNBE gateway A 315 are illustrated as being physically co-located 330. Physically co-locating the control entity 328 and/or the single logical routing database 330 with other equipment such as PPNBE gateway A 315 may be beneficial for optimizing ease of maintenance and configuration of the PPNBE 300, but is not necessary. The control entity 328 and/or the single logical routing database 330 may be located anywhere and are not required to be physically co-located with any PPNBE gateway 315, 318, 316, 325, with each other, or any other equipment that is a part of the private packet network backbone exchange 300.

Control entity 328 may be scalable. As the volume of aggregate traffic through the PPNBE 300 increases, the number of physical computing devices on which the control entity 328 resides may be increased, however, the control entity 328 may still appear as a single logical point code, and/or may be accessed by the signaling network 312 via the information in the single logical routing database 330. If more than one physical computing device is necessary to support the call control entity 328, the more than one physical computing device may be located locally, remotely or some combination of locally and remotely.

Likewise, in some embodiments, the single point code or routing database 330 of the PPNBE 300 may be scalable. The logical routing database 330 of the PPNBE 300 may be physically located across more than one local and/or remote computer-readable storage media entities, however, the logical routing database 330 may logically appear as a single logical routing database 330.

PPNBE gateways 315, 316, 318, 325 may also be scalable. As the number of available physical connections to the PPNBE 300 desired by local exchanges in a geographical area increases, a capacity of an individual PPNBE gateway may be increased. Also, if desired, additional PPNBE gateways may be added to the PPNBE 300 to provide additional trunk connections (e.g., additional communication paths) to the access tandems 302a-302d or to the endpoint exchange 308. The additional gateways, however, may continue to be managed by control entity 328 for servicing calls and providing features and communication services. The PPNBE 300 may maintain the same single point code for control 328 independent of the total number and size of available PPNBE gateways 315, 316, 318, 325.

The number of nodes within the private network backbone 322 may be scalable to support a desired communication traffic volume. Similar to other elements of the PPNBE 300, the nodes within the private network backbone 322 are not required to be physically co-located, but each node merely must be in communicative connection with at least one other node in the private network backbone 322.

As the PPNBE 300 includes a private network backbone 322, this and other above discussed features of the PPNBE 300 allow the PPNBE 300 to handle a logical call capacity far greater than any conventional access tandem known in the art. In fact, the PPNBE 300 may be easily scaled to gracefully handle call traffic from multiple access tandems 302a-302d, even during surge situations. A standard access tandem exchange, such as the access tandem exchange 102 of FIG. 1, simply is not able to handle these volumes of call traffic.

For example, compare and contrast the single-homed tandem access system 100 of FIG. 1 with the multi-homed tandem access system 200 of FIG. 2. Assume, for comparison's sake, that the access tandem 102 of FIG. 1 and the access tandems 202a-202c of FIG. 2 each are able to support a same maximum call capacity "C" before running out of resources. In the single-homed tandem access system 100, any originating calls received at the access tandem 102 after call capacity "C" is reached will be blocked. In the multi-homed tandem access system 200, however, if the tandem access 202a reaches call capacity C, originating parties are still able to dial other TNs that may result in their calls being routed through the tandem 202b and/or the tandem 202c to reach the endpoint 208. In fact, the multi-home tandem access system 200 may support three times the maximum call capacity of the system 100 (e.g., a sum of call capacity C for tandems 202a-202c as compared to a maximum call capacity C for the tandem 102) before calls may start to be dropped. This increase in a volume of essentially simultaneous calls (or at least calls originating within a short duration of time) able to be delivered to a common endpoint 208 of the system 200 may be enabled by the PPNBE's 300 architecture, capacity, and ease of scalability.

Furthermore, the multi-homed access system 200 and the PPNBE 300 may help simplify external trunk resource engineering. Each access tandem exchange 302a-302d need only engineer its available trunking 305a-305d and other resources using typical (and not worst case scenario) engineering parameters, as any overflow call traffic may be handled by a different access tandem in connection with the PPNBE 300. Thus, each individual access tandem exchange 302a-302d is not required to know of the endpoint 308 or communications services provided by the endpoint 308 to determine its resource engineering. Load resource engineering may be handled by the PPNBE, and each individual access tandem exchange 302a-302d may be relieved of this burden. In fact, in some embodiments, the PPNBE 300 may include interfaces to multiple communications services at one or more different endpoints. The access tandems 302a-302d may ignore the tasks of providing, engineering, and managing direct connections to each of the one or more different endpoints, and replace the previously required plethora of connections with a single connection to the PPNBE 300. With the single connection to the PPNBE 300, each access tandem 302a-302d may be enabled to easily and more cost-effectively route to any of the multiple communication services.

Moreover, the present disclosure provides for an ability of a customer of a service provider of the PPNBE 300 to port or assign TNs that the customer may acquire for assignment to the customer's end-users to dedicated LRNs of the service provider. In some embodiments, the customer may be a non-carrier, that is, not a communications service provider. In this manner, the call traffic of multiple customers may be spread across multiple LRNs, thus enabling a higher probability of completed calls, allowing for load balancing across LRNs (and, accordingly, their respective tandems), and minimizing a probability of a concentrate point of congestion in the network.

An additional advantage of the present disclosure may include providing a customer of a service provider of the PPNBE 300 with a report of tandem utilization for those tandems to which the customer's LRNs are homed.

In some embodiments, the system 200 and/or the PPNBE 300 may support multiple tandem-homing designations. For example, multiple sets of tandems may be homed onto the PPNBE 300, where each set may be owned and/or operated by a different service provider or entity. These embodiments may allow an existing IXC (e.g., IXC 210 of FIG. 2) to overflow-route between the different service providers to provide an even greater probability that an originating call may complete.

In one embodiment of the private packet network backbone exchange 300, the following commercial equipment may be included. Voice equipment may include:

Sonus Networks, Inc.'s Sonus PSX™ (policy server)
Sonus Networks, Inc.'s Sonus SGX (SS7 signaling gateway)
Sonus Networks, Inc.'s Sonus DSI-L0 (CDR collector)
Sonus Networks, Inc.'s Sonus DSI-L2 (Billing mediation server)
Sonus Networks, Inc.'s Sonus Insight™ EMS (element management system)
Sonus Networks, Inc.'s Sonus GSX9000 (media gateway)
Performance Technologies 6201 Mini-STP
Empirix XMS (voice monitoring system)

IP and transport equipment may include:

Force 10 (formerly Turin Networks) Traverse® 2000 (DCS)
Brocade (formerly Foundry Networks) NetIron XMR 4000 (IP router)
Brocade (formerly Foundry Networks) BigIron RX (IP router)
Brocade (formerly Foundry Networks) FastIron® Edge X448 may be used as an Ethernet switch in the private packet network backbone exchange 300.

Figure 4:
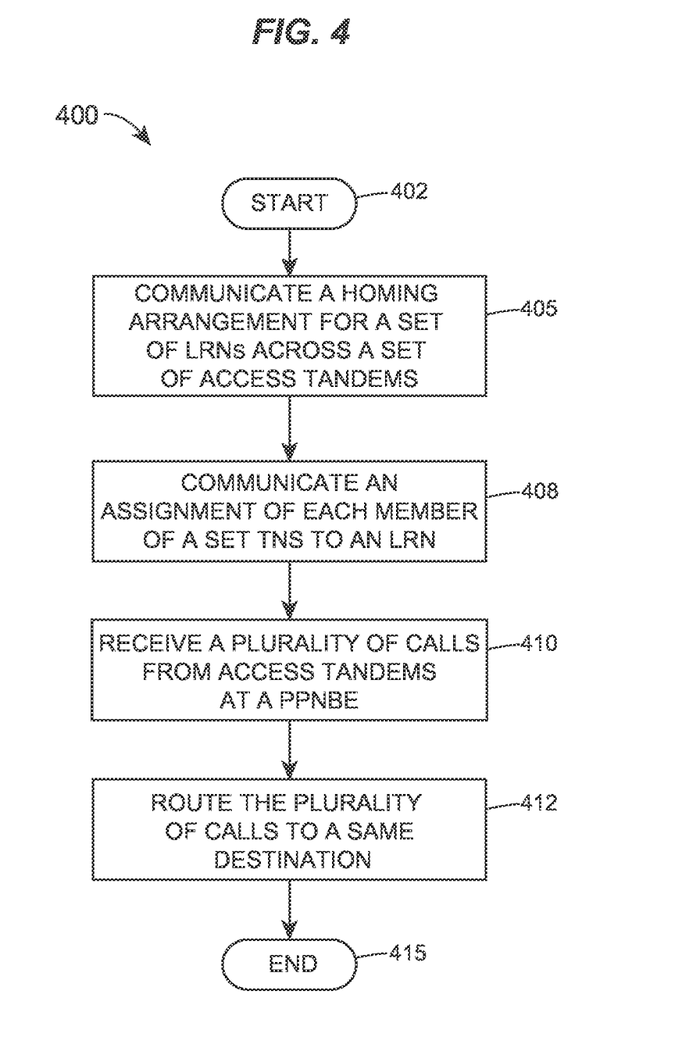
FIG. 4 illustrates an embodiment of a method for providing a communications service via multi-homed tandem access.

FIG. 4 illustrates an embodiment of a method 400 for accessing a communication service via multi-homed tandem access. The method 400 may deliver an increased volume of essentially simultaneous calls (or calls that originate over a short duration of time) to an endpoint that supports the communication service. Examples of the communications service may include a conference call service, a voting or preference-indicating service, a help-line, an electronic fax service or a ticket sales service, or a service provided by a particular CPE (Customer Premise Equipment) or logical user, to name a few. The method 400 may operate in conjunction with embodiments of the system 200 of FIG. 2 and the private packet network backbone exchange 300 of FIG. 3.

At the start 402 of the method 400, the method 400 may communicate a homing arrangement or mapping for a set of Local Routing Numbers (LRNs) across a set of access tandems (block 405). Each of the access tandems may be any type of access tandem known in the art, and may be owned and/or operated by an ILEC or other entity. A specific LRN from the set of LRNs may be homed to each of the access tandems. The homing arrangement may be communicated to one or more other communications exchanges, including other access tandems and/or local exchanges in connection with access tandems. The communicating of the homing arrangement may include populating or overwriting one or more portions of a database such as a LERG (Local Exchange Routing Guide) or other database (block 405).

The method 400 may communicate an assignment of each TN (Terminating Number or Telephone Number) in a set of TNs to a corresponding LRN from the set of LRNs so that the set of TNs is spread or distributed, for routing purposes, across the set of access tandems (block 408). Each TN in the set of TNs may correspond to a same called destination at which the communications service may be accessed. In some embodiments, the called destination or endpoint that supports the communications service may be an exchange. In others, the called destination or endpoint may be an end-user, a CPE or other entity. A TN-to-LRN correspondence may be a one-to-one correspondence, a many-to-one correspondence, or some combination of the two. The assignment arrangement of TNs may be communicated to one or more local exchanges (block 408). In some embodiments, communicating the assignment arrangement may include populating or overwriting one or more portions of a database (block 408). Some or all of the set of TNs may be made available to end-customers who desire to access or use the communication service.

A plurality of originating calls destined for the communications service or endpoint may be received from some or all of the set of access tandems (block 410). Each of the plurality of calls may include a TN from the set of TNs corresponding to the called destination or endpoint. In some embodiments, a TN of a specific call may be selected by an end-user or originating party. The plurality of calls may be received at a private packet network backbone exchange (PPNBE), such as the PPNBE 300 of FIG. 3. In some embodiments, each of the plurality of calls may be received via an originating trunk group at an originating PPNBE gateway of the PPNBE in connection with a particular access tandem to which the LRN indicated in the call is homed. At the originating PPNBE gateway, a call content of the received call may be converted into a packet format.

The plurality of originating calls may be routed, via the PPNBE, to the desired called destination (block 412). In some embodiments, the call content of each of the plurality of calls may be routed from the originating PPNBE gateway over a private packet network backbone of the PPNBE. The call content, in packet format, may be delivered over the private packet network backbone to a terminating PPNBE gateway that is in communication with the desired endpoint. At the terminating PPNBE gateway, the call content may be converted into a format understood by the desired endpoint and delivered over a terminating trunk group connecting the terminating PPNBE gateway and the desired destination.

Call control at the PPNBE may be provided by a single logical call control entity, such as, for example, the control entity 328 of FIG. 3. To set up and monitor the call, the control entity may communicate with the particular access tandem from which the call originates as well as the endpoint or exchange to which the call is destined for termination.

In some embodiments, the block 405 and/or the block 408 of the method 400 may be optional. In some embodiments, the block 405 and/or the block 408 of the method 400 may be performed independently of the remainder of the blocks of the method 400. For example, the blocks 405 and 408 may only be performed by the method 400 when an updated version of the LERG is made available. At the block 415, the method 400 may end.

Figure 5:
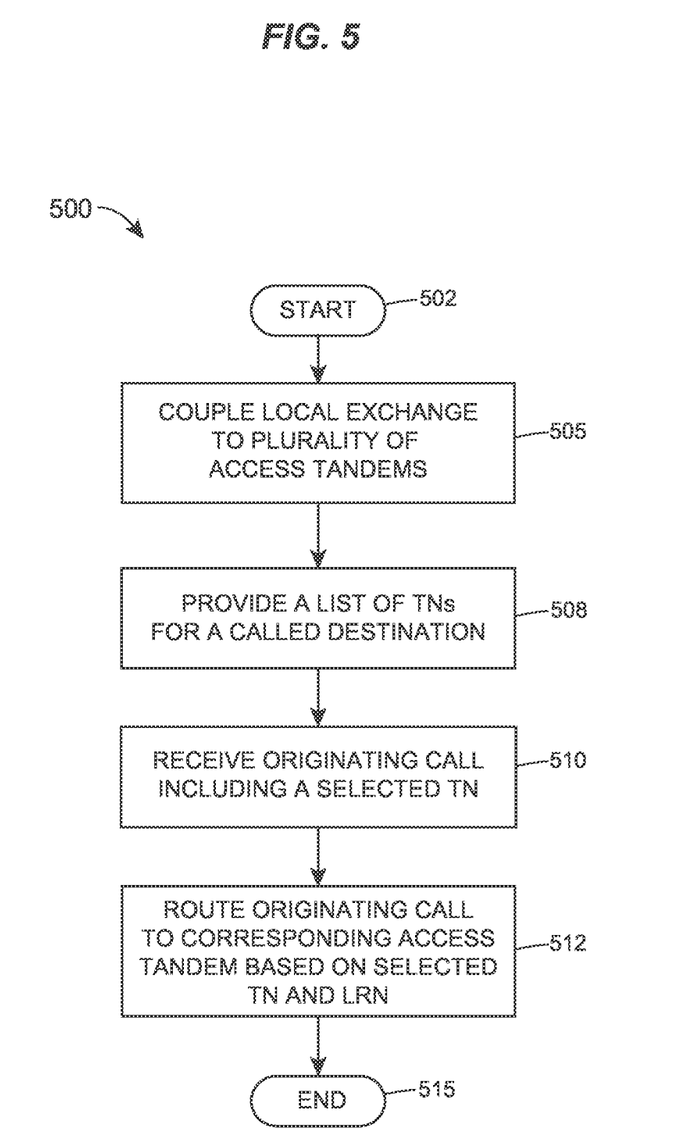
FIG. 5 depicts an embodiment of a method for delivering an increased volume of simultaneous calls to an endpoint.

FIG. 5 illustrates an embodiment of a method 500 for delivering an increased volume of essentially simultaneous calls (or calls that originate during a short duration of time) to an endpoint. The method 500 may be used, for example, in conjunction with embodiments of the systems 200 and 300 illustrated in FIGS. 2 and 3, respectively, and with embodiments of the method 400 depicted by FIG. 4.

The method 500 may be performed at an end-office or local communications exchange, such as one of the local exchanges 110a-110c of FIG. 1. At the start 502, the method 500 may couple the end-office or local exchange to a plurality of access tandems (block 505). In some embodiments, the end-offices may be coupled to the plurality of access tandems via one or more interexchange carrier switches (IXCs). The plurality of access tandems each may be coupled to a private packet network backbone exchange (PPNBE), such as the PPNBE 300, via which calls may be routed to reach a desired endpoint or destination.

A specific Local Routing Number (LRN) may be homed to each of the plurality of access tandems. In some embodiments, a homing arrangement or mapping of each specific LRN to each of the plurality of access tandems may be obtained, for example, from the PPNBE, from a service provider of the PPNBE, or from some other entity. In some embodiments, the mapping may be generated by the local exchange itself. The mapping of each specific LRN to each of the plurality of access tandems may be stored in a remote or local database. In some embodiments, the mapping may overwrite one or more portions of data provided by the LERG (Local Exchange Routing Guide).

The method 500 may provide a list of Telephone or Terminating Numbers (TNs) (block 508). In some embodiments, the list may be provided to a customer or end-user of a service provider that owns or operates the end-office or local exchange. Each TN on the list may correspond to and indicate the endpoint as a desired called destination. Each TN may correspond to a different specific LRN, so that the set of TNs are distributed, for routing purposes, across the plurality of access tandems. In some embodiments, a mapping of each TN to each different specific LRN may be obtained, for example, from the PPNBE, from a service provider of the PPNBE, or from some other entity.

The method 500 may receive an origination from the customer or the end-user at the local exchange (block 510). The origination may include a selected TN from the list of TNs.

The method 500 may route the origination to one of the plurality of access tandems to which a specific LRN corresponding to the selected TN is homed (block 512). The access tandem may then route the origination to the PPNBE for delivery to the endpoint. At block 515, the method 500 may end.

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. Accordingly, it should be understood that the methods and apparatus described herein are illustrative only and are not limiting upon the scope of the claims.

Thus, many modifications and variations may be made in the techniques and structures described and illustrated herein without departing from the spirit and scope of the present claims.

What is claimed:

1. A private packet network backbone exchange (PPNBE) for delivering a call using multi-homed access, comprising:
   a private packet network;
   a logical call control entity, the logical call control entity coupled to the private packet network and to a single logical routing database, and the logical call control entity in signaling communication with a plurality of access exchanges and with an endpoint to which a call is to be delivered;
   an originating connection between the private packet network and each of the plurality of access exchanges; and
   a terminating connection between the private packet network and the endpoint, wherein:
   the endpoint is indicated by each Terminal Number (TN) in a set of TNs,
   each TN in the set of TNs corresponds to a respective LRN (Local Routing Number) in a set of LRNs,
   each LRN in the set of LRNs is homed to a respective access exchange of the plurality of access exchanges,
   the private packet network is configured to receive the call, the call including a selected TN from the set of TNs,
   a content of the call is received by the private packet network over a corresponding originating connection from a corresponding access exchange, and
   the private packet network is further configured to deliver, based on the selected TN and based on an indication from the logical call control entity in conjunction with the single logical routing database, the call from the corresponding originating connection to the terminating connection and the endpoint.

2. The PPNBE of claim 1, further comprising a signaling connection enabling the logical call control entity to be in signaling communication with the plurality of access exchanges and with the endpoint.

3. The PPNBE of claim 2, wherein the signaling connection is at least one of an SS7 signaling connection or an in-band signaling connection.

4. The PPNBE of claim 1, wherein:
the originating connection between the private packet network and each of the plurality of access exchanges includes a first end in connection with an originating private packet network gateway coupled to the private packet network, and a second end in connection with each of the plurality of access exchanges; and
the terminating connection between the private packet network and the endpoint includes a first end in connection with a terminating private packet network gateway coupled to the private packet network, and a second end in connection with the endpoint.

5. The PPNBE of claim 4, wherein the private packet network is configured to deliver the call from the originating private packet network gateway to the terminating private packet network gateway and the terminating connection.

6. The PPNBE of claim 1, wherein at least one of the originating connection or the terminating connection supports at least one of a (Time Division Multiplexed) TDM or a VoIP (Voice over Internet Protocol) protocol.

7. The PPNBE of claim 1, wherein the private packet network uses an Internet Protocol or a packet or cell switching technology.

8. The PPNBE of claim 1, wherein the logical call control entity is configured to route, in conjunction with the single logical routing database and using the private packet network, the call content from any of the originating connections to the terminating connection.

9. The PPNBE of claim 1, wherein each TN in the set of TNs corresponds to a different LRN.

10. A method of delivering a call to an endpoint, comprising:
communicating a homing arrangement to a communications exchange, the homing arrangement including a mapping of each of a plurality of local routing numbers (LRNs) to a respective access exchange in a set of access exchanges;
communicating an assignment arrangement to the communications exchange, the assignment arrangement including a mapping of each Terminating Number (TN) of a set of TNs to a respective LRN from the plurality of LRNs so that members of the set of TNs are distributed for routing purposes across the set of access exchanges;
receiving a call from one access exchange of the set of access exchanges, including receiving the call from the one access exchange at an originating gateway coupled to a private packet network, the call including a selected TN from the set of TNs; and
routing, based on the selected TN and based on an indication from a logical call control entity and a single logical routing database coupled to the private packet network, the call from the originating gateway using the private packet network to a terminating gateway and the endpoint.

11. The method of claim 10, wherein communicating the homing arrangement comprises populating or overwriting at least a portion of a database with at least a portion of the homing arrangement.

12. The method of claim 10, wherein communicating at least one of the homing arrangement or the assignment arrangement to the communications exchange comprises communicating the at least one of the homing arrangement or the assignment arrangement to a local exchange.

13. The method of claim 10, wherein each TN of the set of TNs is mapped to a different LRN.

14. A method of delivering a call to an endpoint, comprising:
coupling a communications exchange to each of a plurality of access exchanges, each of the plurality of access exchanges corresponding to a specific LRN (Local Routing Number) in a set of LRNs;
causing a control entity to determine a set of terminating numbers (TNs), wherein each TN of the set of TNs indicates the endpoint and at least a portion of the TNs included in the set of TNs each corresponds to a specific LRN from the set of LRNs;
receiving an originating call, the originating call including a selected TN from the set of TNs; and
routing the originating call to a corresponding access exchange based on the selected TN.

15. The method of claim 14, wherein coupling the communications exchange to each of the plurality of access exchanges comprises coupling the communications exchange to each of the plurality of access exchanges, the each of the plurality of access exchanges in connection with a private packet network backbone exchange (PPNBE), and the private packet network backbone exchange is in direct connection with the endpoint.

16. The method of claim 14, wherein coupling the communications exchange comprises coupling a communications exchange enabled to provide a communications connection with a CPE (Customer Premises Equipment) by using at least one communications access technology selected from: a wired access technology, a wireless access technology, a VoIP (Voice over Internet Protocol) access technology, a cable telephony access technology, or a broadband access technology.

17. The method of claim 14, further comprising populating or overwriting at least a portion of a routing database with a homing arrangement, the homing arrangement comprising a mapping of the plurality access exchanges to the set of LRNs.

18. The method of claim 14, wherein determining the set of TNs comprises obtaining an assignment arrangement including a mapping of the set of TNs to the set of LRNs.

19. A method for accessing an endpoint using a multi-homed exchange, comprising:
receiving an indication of an assignment of each TN included in a set of TNs to correspond to a specific local routing number (LRN) from a plurality of LRNs;
receiving, at a computing device associated with a communications exchange, a call from one access exchange of a set of access exchanges, wherein:
the call includes a Terminal Number (TN) that is selected from the set of TNs;
each LRN of the plurality of LRNs is homed to a respective access exchange from the set of access exchanges; and
each TN of the set of TNs corresponds to a common destination endpoint; and
routing, by the computing device associated with the communications exchange and based on the TN and the respective LRN, the call to the common destination endpoint.

20. The method of claim 19,
further comprising coupling each access exchange in the set of access exchanges to a private packet network backbone exchange (PPNBE) and coupling the common destination endpoint to the PPNBE; and
wherein routing the call to the common destination endpoint comprises routing the call from the one access exchange to the common destination endpoint using the PPNBE.

21. The method of claim 20, wherein the PPNBE includes:
a logical call control entity of the PPNBE in signaling communication with each of the set of access exchanges and with the common destination endpoint, and the logical call control entity coupled to a single logical routing database; and
a private packet network coupled to the logical call control entity;
wherein routing the call to the common destination endpoint using the PPNBE comprises routing, based on an indication from the logical call control entity operating in conjunction with the single logical routing database, a content of the call over the private packet network to the common destination endpoint.

22. The method of claim 19, wherein receiving the call from the one access exchange of a set of access exchanges comprises:
receiving one of a plurality of calls from the set of access exchanges, each call of the plurality of calls including a respective TN selected from the set of TNs and each TN included in the set of TNs being assigned to a respective LRN of the plurality of LRNs so that members of the set of TNs are distributed across the set of access exchanges.

23. The method of claim 19, wherein each TN corresponds to a different specific LRN from the plurality of LRNs.

\* \* \* \* \*